(12) United States Patent
Arancibia et al.

(10) Patent No.: US 9,670,073 B2
(45) Date of Patent: Jun. 6, 2017

(54) INORGANIC NANOPARTICLE OF MAGNETIC FERRO-IMOGOLITE FOR REMOVING TRACE ELEMENTS

(71) Applicant: Universidad de Santiago de Chile, Santiago (CL)

(72) Inventors: Nicolas Arancibia, Santiago (CL); Carmen Pizarro, Santiago (CL); Maria Teresa Garcia, Santiago (CL); Aldo Escudey, Santiago (CL)

(73) Assignee: Universidad de Santiago de Chile (CL)

( * ) Notice: Subject to any disclaimer, the term of this patent is extended or adjusted under 35 U.S.C. 154(b) by 221 days.

(21) Appl. No.: 14/407,951

(22) PCT Filed: Jun. 11, 2013

(86) PCT No.: PCT/IB2013/054790
§ 371 (c)(1),
(2) Date: Dec. 13, 2014

(87) PCT Pub. No.: WO2014/030080
PCT Pub. Date: Feb. 27, 2014

(65) Prior Publication Data
US 2015/0166366 A1    Jun. 18, 2015

(30) Foreign Application Priority Data
Jun. 13, 2012    (CL) .................... 1582-2012

(51) Int. Cl.
| | |
|---|---|
| *B01J 20/06* | (2006.01) |
| *C02F 1/28* | (2006.01) |
| *C01B 33/26* | (2006.01) |
| *C09C 1/42* | (2006.01) |
| *C09C 1/00* | (2006.01) |
| *B01J 20/12* | (2006.01) |
| *B01J 20/28* | (2006.01) |
| *B01J 20/30* | (2006.01) |
| *B01J 20/32* | (2006.01) |
| *B01J 20/16* | (2006.01) |
| *C02F 101/10* | (2006.01) |
| *C02F 101/20* | (2006.01) |

(52) U.S. Cl.
CPC ............... *C02F 1/288* (2013.01); *B01J 20/06* (2013.01); *B01J 20/12* (2013.01); *B01J 20/16* (2013.01); *B01J 20/28007* (2013.01); *B01J 20/2808* (2013.01); *B01J 20/28009* (2013.01); *B01J 20/28061* (2013.01); *B01J 20/28085* (2013.01); *B01J 20/3085* (2013.01); *B01J 20/3204* (2013.01); *B01J 20/3236* (2013.01); *C01B 33/26* (2013.01); *C09C 1/0081* (2013.01); *C09C 1/42* (2013.01); *C01P 2002/72* (2013.01); *C01P 2004/84* (2013.01); *C01P 2006/12* (2013.01); *C01P 2006/16* (2013.01); *C02F 2101/10* (2013.01); *C02F 2101/103* (2013.01); *C02F 2101/20* (2013.01); *C02F 2305/08* (2013.01)

(58) Field of Classification Search
CPC .................................. B01J 20/06; B01J 20/02
USPC ......................................................... 502/406
See application file for complete search history.

(56) References Cited

U.S. PATENT DOCUMENTS

2010/0028543 A1* 2/2010 Davis .................... B22F 1/0025
427/372.2

FOREIGN PATENT DOCUMENTS

WO    WO 2004/101142 A1 * 11/2004

* cited by examiner

*Primary Examiner* — Edward Johnson
(74) *Attorney, Agent, or Firm* — Tolpin & Partners, PC; Thomas W. Tolpin

(57) ABSTRACT

Inorganic nanoparticle, ferro-imogolite, for removing trace elements, comprising a nanohybrid containing magnetite/goethite and imogolite, a nanotubular aluminosilicate, in its structure, process for preparing an inorganic nanoparticle, and its use in removing trace elements.

2 Claims, 6 Drawing Sheets

INORGANIC NANOPARTICLE OF MAGNETIC FERRO-IMOGOLITE FOR REMOVING TRACE ELEMENTS

SCOPE OF THE INVENTION

Preparation and obtainment of imogolite coated with Fe oxides with or without magnetic properties (Ferro-imogolite) for the removal of Cu (II), Cd (II), and As (V), pollutants present in groundwater as a consequence of the intensification of the mining and agriculture activities. The preparation is carried out by a coating that modifies the surface and the area of imogolite, through the presence of Fe oxide that favors the sorption of Cu (II), Cd (II), and As (V).

BACKGROUND OF THE INVENTION

Mining and agriculture are important sources for incorporating trace elements (TE) to the environment, through the residues generated by their extractive (low grade minerals), and purification (tailings) processes, on one hand, and by constant application of fertilizers, bio-solids and amendments, on the other, thus severely modifying the ecosystem's biogeochemical cycles.

The non-treated effluents from mining, and forestry and farming activities have high concentrations of TE, which have a negative effect, mainly on the aquatic life. Within this group of contaminants, copper (Cu), cadmium (Cd), and arsenic (As) stand out. These trace elements are frequently studied due to their abundance and toxicity. The World Health Organization (WHO) has determined that the maximum concentration of As, Cu, and Cd present in water for human consumption should not exceed 0.01, 1.5, and 0.003 mg $L^{-1}$.

In general, these contaminants bioaccumulate in different tissues, such as bones, liver, kidneys, and brain, and a prolonged exposure is associated to diseases such as cancer, liver and kidney damage, and mental disorders.

There are several removal methods for these type of contaminants, including chemical precipitation, ionic interchange, surface complexing, deposition, the use of membranes, and adsorption.

In the last few years, focus has been put in the use of nanoparticles, natural or synthetic, mainly due to the easy removal of contaminants from aqueous solutions.

The imogolite is a nanotubular aluminosilicate which belongs to the family of inorganic nanotubes, that due to their unique properties in terms of chemical reactivity, mechanical resistance, optical and electrical properties, and a great surface area, have been intensely studied for the past few years. The empiric formula of the imogolite is (OH)$_3$Al$_2$O$_3$SiOH, with dimensions of: 2.5 nm OD, and a variable length between 100 nm and several microns.

One of the most interesting characteristics of imogolite is its capacity of absorbing selectively and simultaneously anions and cations, as a consequence of the active sites constituting their surfaces; silanols ($\equiv$Si—OH), constituting the inner surface; and aluminols ($\equiv$Al—OH, and $\equiv$Al$_2$—OH), predominant in the outer surface. These groups naturally functionalize imogolite, being excellent for nanotechnologic applications. Different processes of obtainment, and structural and surface modifications, have been driven by this in order to promote their uses in manufacturing electronic and optic devices, transporting and managing drugs, removing contaminants, and storing energy.

Therefore, obtaining an iron-coated imogolite having or not magnetic properties has a high industrial potential due to the physical and chemical properties it has and which few nanoparticles are able to offer.

The present invention proposes a simple methodology for obtaining a nanohybrid formed between imogolite and Fe oxide (Ferro-imogolite)

The spatial arrangement of imogolite accounts for three types of pores—intra-unitary, inter-unitary, and inter-fibrillar, which additionally allow for a selective retention per size. Its high chemical flexibility, given by the presence of two types of active surface groups (silanols ($\equiv$Si—OH), in the inner surface; and aluminols ($\equiv$Al2-OH, and $\equiv$Al—OH), in the outer surface), which naturally functionalize, project this nanoparticle as an excellent substrate for several environmental applications. The present application presents a method for obtaining iron-coated imogolite, with or without magnetic properties, by a process based in excess-solvent impregnation.

The present application also describes the procedure for obtaining a nanohybrid, referred to as Ferro-imogolite, with the typical characteristics of a superparamagnetic nanoparticle in the case of preparing a magnetic oxide coating, the final product maintaining in this case the main properties of imogolite and magnetite. The Ferro-imogolite thus obtained is a product that presents a different behavior in comparison to the product obtained from the physical mix of the starting materials. Differences in the electrophoretic and magnetic behavior are observed, indicating that Ferro-imogolite behaves as a single nanoparticle.

PURPOSE OF THE INVENTION

The purpose of the present invention is the application of iron-oxide-coated imogolite, magnetic or not, (Ferro-imogolite), for removing trace elements such as Cu (II), Cd (II), and As (V) present in some natural water springs and courses as well as in water from anthropogenic activities.

DESCRIPTION OF THE INVENTION

The purpose of the present invention is obtaining a product such as Ferro-imogolite, having magnetic properties or not, for removing trace elements, contaminants that can be present in groundwater and in shallow watercourses, and which presence is increased as a consequence of the intensification of the mining and agriculture activities. A process of iron-coating allows modifying the surface and area of imogolite, providing that the presence of Fe oxide, mainly magnetite in the case of magnetic iron, and goethite in the case of non magnetic iron, promotes sorption of trace elements, mainly through electrostatic effects and through changes in the affinities with respect to imogolite, or the physical mixture of iron oxide and synthetic imogolite.

The capacity of sorption of trace elements such as Cu (II), Cd (II), and As (V) is determined by the Langmuir isotherms, which indicate that Ferro-imogolite has a greater capacity of sorption than that of imogolite, and the physical mixture of iron oxide/imogolite.

The results allow to conclude that Ferro-imogolite has a high potential for treating contaminated water and other nanotechnologic applications due to its high chemical reactivity.

DESCRIPTION OF FIGURES

FIG. 1.B shows diffractograms of the binary systems Ferro-imogolite (a), and Iron oxide/imogolite (b). NTA=Imogolite; M=Magnetite; G=Goethite.

DETAILED DESCRIPTION OF THE INVENTION

Synthesis of Imogolite

Figure 1:
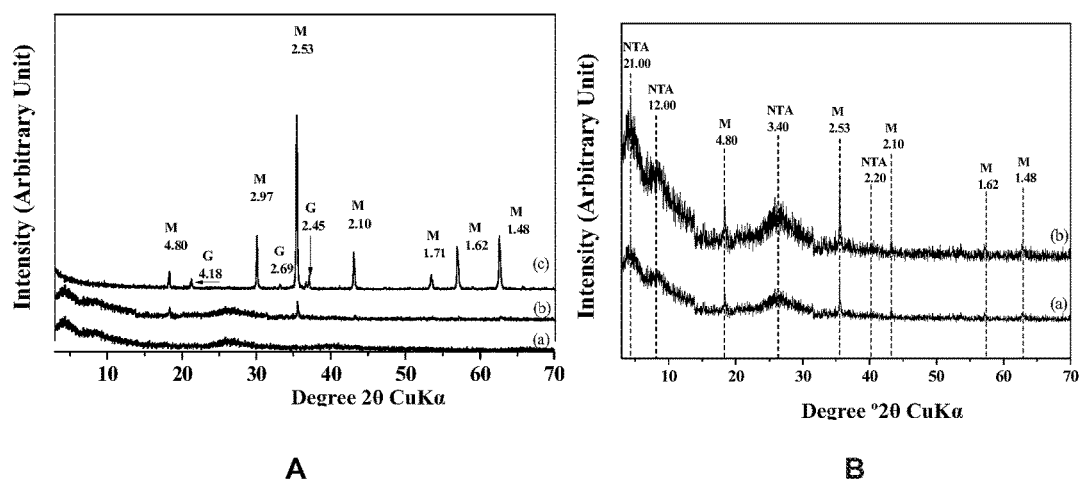
FIG. 1.A corresponds to the a) Imogolite, b) Ferro-imogolite, and c) Iron oxide/imogolite.

Imogolite is obtained by adding to an aqueous solution 5 mM $Al(NO_3)_3.9H_2O$ ethyl orthosilicate (TEOS) until a ratio for Al:Si of 2:1 is attained. Then, a solution of 0.1 M NaOH is added at a speed of 1.0 mL/min until a ratio for Al:Si:OH of 2:1:4 is attained, the resulting solution being stirred for 60 min and then heated to 95° C. for 144 h. Once the aging process is finished, the resulting solution is left to cool down to room temperature. Subsequently, a solution of 0.1 M $NH_4OH$ is vigorously added until a pH near 8.0 is reached. The solid is concentrated by centrifugation at 9,000 rpm for 30 min, and washed with bi-distilled water until an electric conductivity less than 0.78 dS/m is attained.

Iron Oxides and Ferro-Imogolite Syntheses:

In order to obtain Fe oxides, 0.250 g $FeSO_4.7H_2O$ are dissolved in 20.0 mL bi-distilled water, previously degassed with $N_2$. Then, 0.033 g $KNO_3$ and 0.5 mL concentrated $NH_4OH$ are added to make the Fe oxides precipitate.

Ferro-imogolite is obtained by dissolving 0.620 g $FeSO_4.7H_2O$ in 100 mL bi-distilled water at 90° C., in a $N_2$ atmosphere. To this solution 0.250 g lyophilized imogolite are added in order to obtain an imogolite/Fe ratio close to 2, and are left stirring for 4 h. Subsequently, 0.033 g $KNO_3$ and 0.5 mL concentrated $NH_4OH$ solution are added to make the Fe oxides precipitate. The described process helps obtaining a magnetic Ferro-imogolite.

The same procedure, but in an open system (without $N_2$ atmosphere) can be applied in order to obtain other types of Fe oxides, such as goethite, magemite, thus being obtained a Ferro-imogolite without magnetic character.

Characterization of the Nanoparticles:

The obtained product is characterized by using X-ray diffraction (DRX), transmission electron microscopy (TEM), Mössbauer spectroscopy, electrophoretic mobility (EM), vibrating sample magnetometry (VSM), and SQUID.

In order to obtain the diffractograms, samples are scanned from 3° to 70° 2θ using a step size of 0.02° 2θ, and scanning every step every 10 s 1.0 s. The X-ray patterns are collected by using CuKα radiation in a Philips XPert diffractometer provided with a Theta/Theta goniometer, and equipped with a divergence slit of 1.5°, a receiving slit of 0.2°, a monochromator, and a scintillation counter. The transmission electron microscopy for the obtained products is carried out with samples in diluted and dried suspensions in a $N_2$ atmosphere in a carbon grid, which then are covered with Cu (Lacey Formvar 300 Square, Pelco) before taking measures. Samples are examined in a Zeiss EM 910 model transmission electron microscope, that operates at 80 kV.

The Mössbauer analysis is carried out at 298 K with a constant transmission of acceleration with a source of <30 mCi $^{57}Co$/Rh. Data is stored in a 512-channel MCS memory drive, with a Doppler velocity of around ±10 mm $s^{-1}$. Experimental data is plotted using Lorentzian functions, and calculated through the NORMOS™ program.

In particular, the samples of magnetic Ferro-imogolite are subjected to a study of magnetization, which is determined in function of the outer field applied by a vibrating sample magnetometer (VSM) at room temperature and at 77 K. Additionally, the magnetic behavior of the obtained samples is evaluated in presence of several $μ_0H$ fields with different intensities between 0.04 T and 1 T, and for temperatures of 50 K to 300 K by means of a SQUID magnetometer (MPMS XL7, Quantum Design).

The isoelectric point (IEP) is measured by electrophoretic mobility (EM) in a Zeta Meter ZM-77 equipment. Around 30 mg sample are suspended in 200 mL of a solution at a ionic force of 1.0 mM, and the electrophoretic mobility is determined in function of pH. From the ME versus pH graph the IEP value is obtained as the pH value at which ME=0.

X-Ray Diffraction:

Broad diffraction patterns indicate a paracrystalline arrangement typical of imogolite (FIG. 1), standing out four diffraction bands centered in 21.0, 12.0, 3.4, and 2.2 Å. The DRX spectrum of synthetic Fe oxide shows two types of Fe minerals, wherein the diffraction bands with reflections at 4.80, 2.97, 2.53, 2.42, 2.10, 1.71, 1.62, and 1.48 Å are associated with magnetite (majority mineral), while diffractions at 4.18, 2.69, and 2.45 Å correspond to goethite, a non-magnetic iron oxide.

The diffractograms made to the Ferro-imogolite binary systems, and the iron oxide/imogolite mixture showed the diffraction patterns characteristic of imogolite and magnetite (reflections at 21.0, 12.0, 4.80, 3.40, 2.53, 2.20, 2.10, 1.71, 1.62, 1.48 Å), when the procedure favors the magnetic coating. A higher intensity in the diffraction signals is observed, especially in the ones corresponding to magnetite, for the physical mixture of iron oxide/imogolite in comparison to the Ferro-imogolite, which suggests a surface distribution that leads to the formation of monolayers and to occasional three-dimensional growths that lead as a consequence to a lower intensity of the diffraction lines (FIG. 1).

The procedure described helps to obtain an iron-oxide-coated imogolite with a variable proportion of magnetic iron oxide (magnetite), and non-magnetic iron oxide (goethite), depending on the interest of application. The decrease in the application time of nitrogen during the synthesis allows increasing the proportion of non-magnetic iron oxide in the final product.

Mössbauer Spectroscopy

Figure 2:
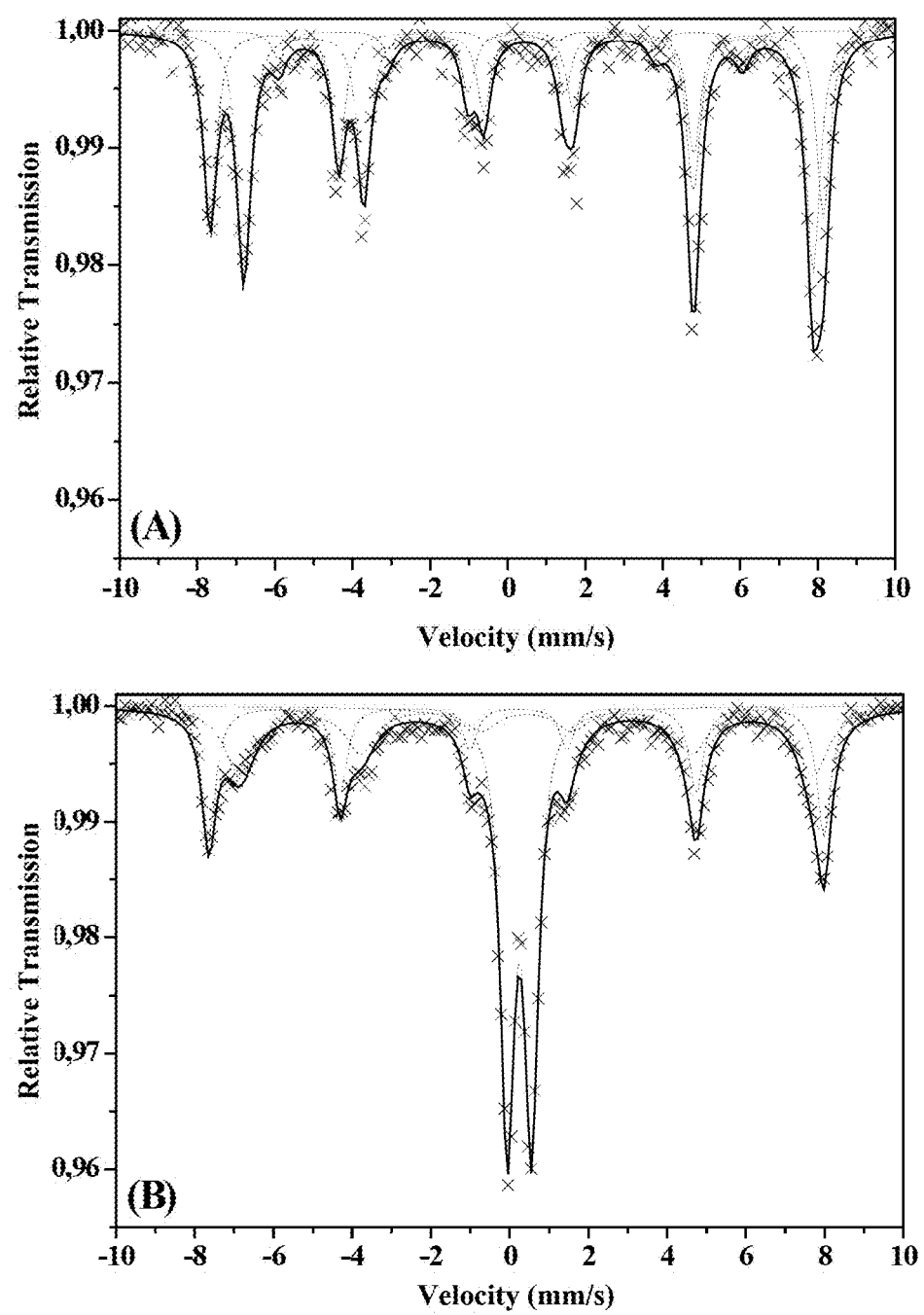
FIG. 2. Mössbauer spectra at room temperature: (A) synthetic Fe oxide, (B) Ferro-imogolite.
Figure 3:
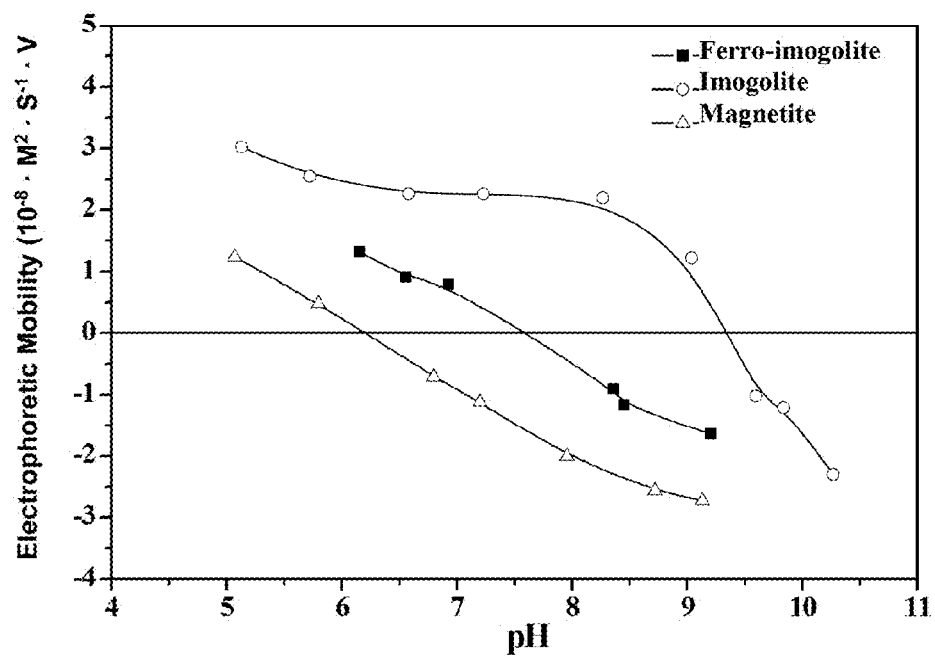
FIG. 3. Electrophoretic mobility versus pH curves for synthetic Fe oxides, Ferro-imogolite, and imogolite.

FIG. 2 shows the Mössbauer spectra corresponding to magnetite and Ferro-imogolite. The spectrum of synthesized Fe oxide shows hyperfine patterns characteristic of magnetite (relative sub-spectral area, RA=93(2) %).

The presence of two magnetic sextets, one with a relative isomeric displacement of αFe, δ=0.333 (7) mm $s^{-1}$, a hyperfine magnetic field, $B_{hf}$=49.01 (5) T, value corresponding to the mixture of valence $Fe^{3+}/Fe^{2+}$ in octahedral sites, the Mössbauer parameters for the other sextet are δ=0.645

(5) mm s$^{-1}$, B$_{hf}$=45.51 (4) T, corresponding to Fe$^{3+}$ in tetrahedral sites of the spinel type structure (FIG. 2A, Table 1) confirms the presence of goethite traces (α-FeOOH, RA=7 (2)%). The Mössbauer spectrum for the iron oxide/imogolite mixture shows parameters similar to the ones described for magnetite, a decrease of the signals' intensity being noted as a consequence of the mixture.

The Mössbauer spectrum and parameters run on Ferro-imogolite present significant differences regarding what was determined for magnetite and the iron oxide/imogolite mixture. It is noted that the Fe oxide formed on the imogolite surface has a hyperfine structure characteristic of the magnetite, with a relative sub-spectral area, RA=58 (2) %. The adjustment of the system spectrum indicates the existence of two types of sites—one corresponding to the contribution of Fe$^{3+}$ in tetrahedral sites with an average relative isomeric displacement to αFe, δ=0.304 (5) mms$^{-1}$, cuadrupole splitting ε=−0.042 (9), mm s$^{-1}$ and with a hyperfine field, B$_{hf}$(max)=48.43 (4) T (RA=27%), and a contribution corresponding to the mixture in octahedral sites of Fe$^{3+}$/Fe$^{2+}$, with δ=0.54 (1) mm s$^{-1}$ and ε=−0.00*(fixed parameter during the adjustment procedure), and a hyperfine field of B$_{hf}$(max)=45.0 (1) T (RA=31%). A central doublet accounts for the presence of Fe$^{3+}$ with a relative area, RA=42 (5)%, which suggests that the Fe$^{2+}$ used in the process of magnetite formation becomes oxidized during the Ferro-imogolite preparation (FIG. 2B, Table 1).

Ferro-imogolite. Two kinds of particles that migrate in the same direction, but at different speeds, can be clearly observed in the pH interval of 4 to 6, and in opposite directions at pH higher than 7. In the Ferro-imogolite, only a single family of nanoparticles is observed, behavior that shows a strong chemical interaction between the iron acid and the imogolite in the Ferro-imogolite binary system as a consequence of the coating process.

The extent of apparent surface coating (ASC) of the Fe oxide on the imogolite (Ferro-imogolite) surface was determined according to the equation (Eq. 1), corrected by the molecular weights and the isoelectric point (M$_s$ and IEP$_M$), considering the proportional contribution of these oxides (Gil-Lambias and Escudey-Castro, 1982).

$$ASC = \frac{(IEP_S - ZPC)M_S^{-1}}{(M_M^{-1} - M_S^{-1})(ZPC - IEP_S) + (IEP_S - IEP_M)M_M^{-1}} \times 100. \quad \text{(Eq. 1)}$$

The Fe coating percentage is close to 33%, lower than that set forth theoretically (50%), but in agreement with the Fe(III) detected by Mössbauer spectroscopy.

These data suggest that the percent of iron oxide coating over imogolite in the Ferro-imogolite system is restricted to a limited amount of active sites of imogolite that allow the sorption of Fe(II), which are conditioned to the pH, and the

TABLE 1

Mössbauer parameters for Fe oxide and Ferro-imogolite.

| Sample | Allocation | δ/mm s$^{-1}$ | ε, Δ/mm s$^{-1}$ | Γ/mm s$^{-1}$ | B$_{hf}$/T | RA/% |
|---|---|---|---|---|---|---|
| Fe oxide | [MG] | 0.333(7) | 0.010(1) | 0.41(2) | 49.01(5) | 40(2) |
|  | {MG} | 0.645(5) | −0.001(1) | 0.43(2) | 45.51(4) | 53(2) |
|  | α-FeOOH | 0.320(4) | −0.270(8) | 0.40(1) | 37.00(3) | 07(2) |
| Ferro-imogolite | [MG] | 0.304(5) | −0.042(9) | 0.42(2) | 48.43(4) | 27(1) |
|  | {MG} | 0.540(1) | 0.0000* | 0.96(6) | 45.00(1) | 31(2) |
|  | Fe$^{3+}$ (Super) paramagnetic | 0.355(4) | 0.73(5) | 0.49(2) | — | 30(5) |
|  | Fe$^{3+}$ (Super) paramagnetic | 0.356(3) | 0.50(1) | 0.23(4) | — | 12(5) |

[ ] and { } identify the octahedral and tetrahedral sites for the Fe in magnetite, respectively. The number between parentheses corresponds to the error over the last significant number, estimated to the minimum squared.
δ = average relative isomeric displacement to αFe;
ε = cuadrupole splitting;
Δ = cuadrupole division;
Γ = line width;
Bhf = hyperfine magnetic field;
RA = relative sub-spectral area.
*Fixed parameter during the adjustment procedure.

Electrophoretic Mobility and Isoelectric Point (IEP)

The surface behavior of imogolite, of the iron oxide/imogolite mixture, and of the Ferro-imogolite is described through measures of Electrophoretic Mobility, technique sensitive to the changes undergone by a surface in its surface composition, the IEP being a good parameter indicative of what occurs on the imogolite surface as an effect of the Fe-oxide coat.

Figure 4:
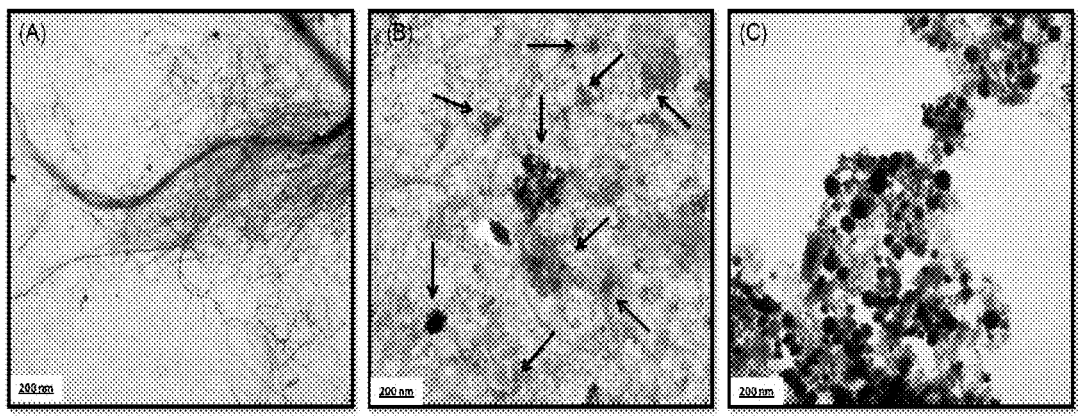
FIG. 4. Imogolite (A), Ferro-imogolite (B), and Iron oxide/imogolite (C) microscopies. Black arrows indicate the presence of Fe oxides, corresponding to three-dimensional increases.

The imogolite presents a positive charge in a broad pH range and a high IEP value (9.5-10.5), indicating that this clay has a high affinity with adsorbing anions in a broad pH range, while the synthetic magnetite IEP was of 6.5, which is characteristic of this kind of materials. The Ferro-imogolite binary system IEP has a value intermediate to the starting materials, the value attaining a value of IEP=7.8 (FIG. 4).

The system comprising the iron oxide/imogolite mixture shows an electrokinetic behavior different from that of adsorbed Fe would act as a pole of attraction for new Fe atoms, favoring the three-dimensional growth of the oxide on the surface of the imogolite.

MET Analysis:

The analysis of the solid imogolite and Ferro-imogolite samples by TEM showed that the spatial arrangement of the imogolite nanotubes resembles a spiderweb, which would account for its potential capacity for adsorbing selectively by size (FIG. 4A). The average dimensions of the synthetic imogolite exceed 200 nm in length.

In the case of the iron oxide/imogolite mixture and Ferro-imogolite binary systems significant differences are observed in the size and distribution of the iron oxide over the imogolite nanotubes (FIGS. 4 B, and C). For the physical mixture (iron oxide/imogolite), it is clearly observed that the average size of magnetite is greater than 50 nm, while the length of imogolite does not exceed 200 nm. In the case of imogolite subjected to the coating process, it can be determined that as for the magnetite its size falls within a range of 20 to 50 nm, while the length of the imogolite nanotubes is >200 nm, which are highly condensed (FIG. 4B) as a result of the conditions for obtaining the oxide.

The analysis of the microscopies made to Ferro-imogolite indicate that the distribution of Fe oxides on the imogolite surface is heterogeneous, wherein zones of high iron oxide concentration are observed, possibly due to the sorption of Fe (II), precursor of magnetite, occurring in specific sites where possible interactions of electrostatic origin are favored, suggesting that the first molecules of Fe adsorbed form nuclei in different parts of the imogolite outer surface, conditioning that the growth of iron oxide crystals occur three-dimensionally and not forming a monolayer, which has been documented in carbon nanotubes. While the three-dimensional formation of Fe oxide is clearly seen in the microscopies (FIG. 4B), this process fails to explain for itself the change in the IEP value of 9.5 that imogolite has at 7.8 determined for Ferro-imogolite. This variation necessarily implies that a great surface of the imogolite is covered by Fe, and that in some zones a three-dimensional growth occurs.

Magnetic Characterization:

The magnetic behavior of magnetite, and the iron oxide/imogolite mixture and Ferro-imogolite binary systems is determined by using VSM and SQUID magnetometers (Table 2).

TABLE 2

Magnetic Parameters of Imogolite, Magnetite, Ferro-imogolite, and Iron Oxide/Imogolite.

| Sample | Saturation Magnetization (emu · g$^{-1}$) | Coercivity [Oe] | Remanence (emu · g$^{-1}$) |
|---|---|---|---|
| Imogolite | 0 | 0 | 0 |
| Magnetite | 90.8 | 143.2 | 17.6 |
| Ferro-imogolite | 9.8 | 54.3 | 0.5 |
| Iron Oxide/ Imogolite | 15.5 | 121.3 | 4.0 |

The magnetic characterization of the samples showed significant differences between all the materials that were analyzed. The magnetic parameters indicated that the synthesized magnetite has a slightly lower magnetization saturation than that reported in the literature (90.76 emu g$^{-1}$), perhaps as a consequence of the presence of goethite, generated as a by-product of the obtainment process (Table 2).

Differences are observed in the magnetic behavior of the iron oxide/imogolite mixture and Ferro-imogolite compared to magnetite. The data indicate that the saturation magnetization between the iron oxide/imogolite mixture and Ferro-imogolite is 83% and 89%, respectively, which is lower than that of magnetite. The coercivity and remanence of the iron oxide/imogolite mixture; however, are considerably higher than those of Ferro-imogolite as the physical mixture has different sizes and distribution of the magnetite nanoparticles, enhancing much more the character of magnetite (Table 2).

Figure 5:
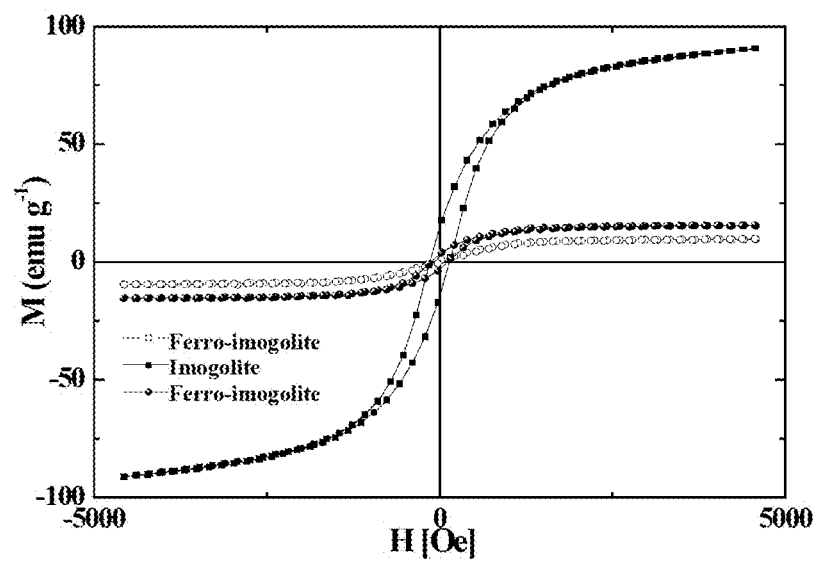
FIG. 5. Hysteresis curve for magnetite, Iron oxide/imogolite, and Ferro-imogolite.

The magnetization curve of imogolite shows that this nanoparticle lacks magnetic components, a situation that changes radically once the coating process is finished, wherein all the magnetic parameters, and mainly the saturation magnetization, determined for the Ferro-imogolite system, indicate that the formed nanohybrid may be considered a magnetic nanoparticle (FIG. 5).

The coercitivity values of magnetite and of the iron oxide/imogolite binary system are higher than 100 Oe at room temperature, while the Ferro-imogolite sample has a coercitivity close to 50 Oe. These differences confirm that the magnetite nanoparticles on the surface of imogolite (Ferro-imogolite) are smaller than those present in the iron oxide/imogolite system, as was also determined by transmission electron microscopy (FIG. 2B).

Figure 6:
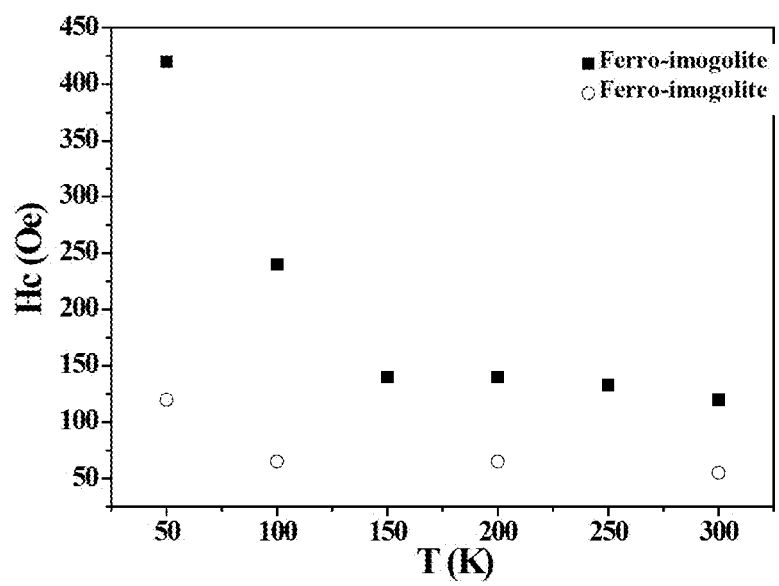
FIG. 6. Evolution of the coercive field in relation to the temperature in the iron oxide/imogolite and Ferro-imogolite mixture.

In the same way, the magnetic properties for the iron oxide/imogolite mixture and Ferro-imogolite systems are determined as a function of temperature with a SQUID magnetometer (FIG. 6). The evolution of coercitivity as a function of temperature showed clear differences between the iron oxide/imogolite mixture and Ferro-imogolite, confirming that the magnetic behavior is unique to each system.

The effect of temperature on the coercitivity of the iron oxide/imogolite mixture and Ferro-imogolite binary systems confirms that this parameter increases when the temperature decreases. In the case of the iron oxide/imogolite mixture, the coercitivity increases its value below 150 K, while in Ferro-imogolite it increases at temperatures close to 100 K.

This behavior confirms that the magnetite nanoparticles present in the Ferro-imogolite system are smaller than those present in the physical mixture, since above 100 K the magnetization of the nanoparticles becomes unstable with increasing temperature.

Sorption Studies of Cu (II), Cd (II), and As (V):

The sorption studies of Cu, Cd, and As are carried out from stock solutions of 1000 mg L$^{-1}$ of Cu(II), Cd(II), and As(V) prepared by dissolving Cu(NO$_3$)$_2$, Cd(NO$_3$)$_2$, and Na$_2$HAsO$_4$.7H$_2$O in bi-distilled water. The isotherms and sorption kinetics of Cu(II), Cd(II), and As(V) were carried out by a batch system, using 50-mL polypropylene tubes containing 50 mg imogolite or Ferro-imogolite in 20 mL of the different solutes (Cu, Cd, and As) in a 1.0×10$^{-3}$ M solution of KNO$_3$. The temperature and pH conditions used for Cu (II), and Cd (II) are 25±2° C., and a controlled pH of 5.5±0.2, while for As (V) the pH value is 6.5±0.2.

Sorption Kinetics:

A concentration of 50 mg L$^{-1}$ of the metal was used for the study of the Cu(II) and Cd(II) kinetics. The pH of each suspension is adjusted by addition of HNO$_3$ or KOH (10$^{-1}$ mol L$^{-1}$). An ISE meter (sensION™4) is used to detect the concentrations of Cu(II) and Cd(II). Equilibrium is achieved by stirring at 200 rpm at a controlled temperature of 25° C. The concentration of Cu(II) and Cd(II) is monitored at 30-minute intervals. A blank was used as control in order to determine the electrode response in the absence of Cu(II) and Cd(II). The adsorbed amount of ion is determined from the difference between the initial and final concentration in solution, according to the equation 2.

$$q_t = \frac{(C_0 - C_t)V}{(M)}. \qquad \text{(Eq. 2)}$$

wherein Co and Ct are the initial concentrations and the concentrations at time t of Cu(II) and Cd(II) in (mg L−1), respectively, V (L) is the volume, and M (g) is the mass of the substrate.

For As(V) the dependence of sorption as a function of time was studied on a solution of As(V) containing 350 mg·L$^{-1}$ in equilibrium with 50 mg of imogolite or Ferro-imogolite. The samples were equilibrated using an orbital shaker during 24 h for Cu(II) and Cd(II), and during 96 h for As(V). The concentration of As(V) in solution was determined at 5, 15, and 30 min, and 1, 3, 6, 10, and 24, 48, and 96 hours. The samples were centrifuged at 10,000 rpm for 30 min. Additionally, the supernatant was filtered through 0.22-μm Millex-GX membranes, and analyzed by ICP-OES.

Sorption Isotherms:

The range of initial concentrations used in the sorption isotherms was 1, 2, 5, 10, 20, 40, 50, 70, 80, 100 mg L$^{-1}$ for Cu(II) and Cd(II), and 1, 5, 10, 20, 50, 70, 100, 150, and 200 mg L$^{-1}$ for As(V). At the same time, competition between Cu(II) and Cd(II) is studied in both substrates. The same Cu(II) and Cd(II) concentrations were used in the multi-component system as in the mono-component system.

Electrophoretic Mobility and Isoelectric Point (IEP):

The surface behavior of imogolite and Ferro-imogolite is described by measuring the electrophoretic mobility. Imogolite has a positive charge over a wide pH range, and a high IEP value (9.5), while the Ferro-imogolite IEP was 7.8.

Surface Area:

The microporous structure of imogolite and Ferro-imogolite is studied by N$_2$ adsorption. It was found that the imogolite specific surface area (BET) is similar to those reported in the literature.

TABLE 3

Surface area and porosity parameters of imogolite and Ferro-imogolite.

|  | Imogolite | Ferro-imogolite |
|---|---|---|
| Surface area (m$^2$/g) | 303 | 206 |
| External surface area (m$^2$/g) | 180 | 117 |
| Micropore volume (cm$^3$/g) | 0.02 | 0.03 |
| Micropore area (m$^2$/g) | 66 | 46 |
| Pore volume (cm$^3$/g) | 0.25 | 0.20 |
| Pore diameter (Å) | 10 | 15 |

The surface area decreases significantly in the Ferro-imogolite binary system, wherein the value is 206 m$^2$/g; however, an increase in the (micro)pore diameter and volume in Ferro-imogolite is observed (Table 3).

Sorption Isotherms of Cu (II), Cd (II), and As (V):

Langmuir's model is used to describe the sorption of Cu(II), Cd(II), and As(V) on imogolite and Ferro-imogolite (Eq. 3)

$$q = \frac{q_m \cdot K_L \cdot C}{1 + K_L \cdot C} \quad \text{(Eq. 3)}$$

In the equation 3, $q_m$ (mg·g$^{-1}$) is the maximum adsorption capacity, q (mg·g-1) is the amount of analyte adsorbed, C (mg·L$^{-1}$) is the solute at equilibrium, and $K_L$ is Langmuir's constant related to the adsorption energy (L·mg$^{-1}$).

The parameters obtained from the application of both models to the sorption of Cu(II), Cd(II), or As(V) on imogolite and Ferro-imogolite are summarized in Table 4.

TABLE 4

Langmuir parameters for the sorption of Cu(II), Cd(II), and As(V) in mono- and multi-component systems.

| | Imogolite | | | Ferro-imogolite | | |
| | Langmuir's Constants | | | | | |
| Analyte | $K_L$ | $q_m$ | $r^2$ | $K_L$ | $q_m$ | $r^2$ |
|---|---|---|---|---|---|---|
| Cu* | 1.52 | 64.67 | 0.987 | 1.12 | 127.52 | 0.987 |
| Cu** | 7.29 | 41.2 | 0.987 | 5.02 | 75.13 | 0.987 |

TABLE 4-continued

Langmuir parameters for the sorption of Cu(II), Cd(II), and As(V) in mono- and multi-component systems.

| | Imogolite | | | Ferro-imogolite | | |
| | Langmuir's Constants | | | | | |
| Analyte | $K_L$ | $q_m$ | $r^2$ | $K_L$ | $q_m$ | $r^2$ |
|---|---|---|---|---|---|---|
| Cd* | 48.19 | 160.22 | 0.983 | 36.01 | 252.23 | 0.983 |
| Cd** | 3.99 | 116.2 | 0.996 | 15.37 | 125.92 | 0.996 |
| As | 1.75 | 260.9 | 0.976 | 2.26 | 643.19 | 0.996 |

*Mono-component system,
**Multi-component system

Figure 7:
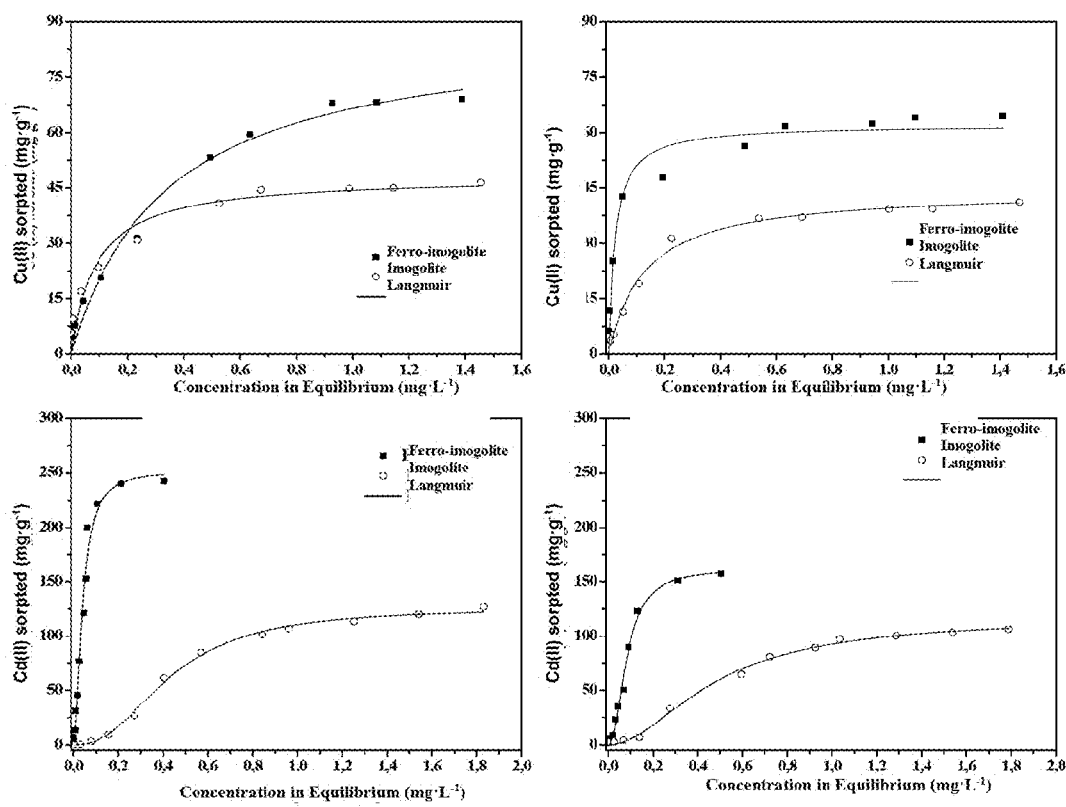
FIG. 7. Sorption isotherms for Cu (II) in mono- and multi-component systems. Sorption isotherms for Cd (II) in mono- and multi-component systems over imogolite and Ferro-imogolite. Axes are found in different scales.

The sorption of Cu(II) and Cd(II) in the mono- and multi-component systems on Ferro-imogolite is much greater than on imogolite (FIG. 7, Table 4), although the nanoparticle subjected to the coating process decreased its surface area considerably.

Different affinities are observed depending on the TE and the type of nanoparticles used. In the mono- and multi-component systems, the sorption curve of Cu(II) is of the L type for imogolite and Ferro-imogolite. These types of isotherms are characterized by a slope that does not increase with solute concentration. This property is the result of the adsorbent's high affinity for the solute when it is in low concentrations, thereby decreasing the surface area.

Although the behavior described for both systems is the same, in monocomponent systems the slopes of the sorption isotherms indicate that under these conditions this phenomenon occurs with greater intensity.

The sorption of Cd(II) on imogolite is described by a type-S curve suggesting that the affinity between this element and imogolite is weak and independent of the evaluated system. However, this condition changes drastically when Ferro-imogolite is used, where the shape of the isotherm curve is of the H type, showing that the affinity of this element for this nanoparticle is greater than that for imogolite, possibly as a consequence of the great affinity of the new type-≡Al—OH superficial groups formed during the coating procedure.

The increase of the sorption capacity with the incorporation of Fe can be accounted for by the superficial changes that occur in imogolite as a result of the coating process, wherein the decreased superficial charge seen in Ferro-imogolite with respect to imogolite favors the sorption of cations from an electrostatic point of view. The maximum sorption capacity ($q_m$, Langmuir parameter that indicates saturation of the monolayer) in both nanoparticles was higher for the Cd(II) isotherms than for those of Cu(II), indicating that this element sorption is highly favored. This parameter in a multi-component system decreases about 41% and 36% for Cd(II), and 50% and 27% for Cu(II) in Ferro-imogolite and imogolite, respectively.

Competition between Cd(II) and Cu(II) for the sorption sites present in both nanoparticles has a considerable impact on the sorption capacity and intensity. In imogolite, the $K_L$ values determined for Cd(II) and Cu(II) in multi-component systems are clearly different from those obtained in mono-component systems (Table 4), where in the case of Cd(II) the presence of Cu(II) causes the sorption to take place preferentially on lower energy sites, as shown by the decrease in the value of $K_L$ obtained for Cd(II) in multi-component systems. A different behavior was observed for Cu(II), wherein the sorption intensity of this element is greater when it is competing with Cd(II), indicating that in multi-component systems the sorption of Cu(II) takes place predominantly on high energy sites, suggesting that the active sites of imogolite are more specific for this element than for Cd. For Ferro-imogolite the sorption intensity in the mono- and multi-component systems shows a tendency similar to that seen for imogolite. The magnitude of the variation of $K_L$ among these systems compared to imogolite; however, is smaller, a phenomenon that can be accounted for by the changes in the number of specific surface active sites for each TE as a result of the coating process.

Figure 8:
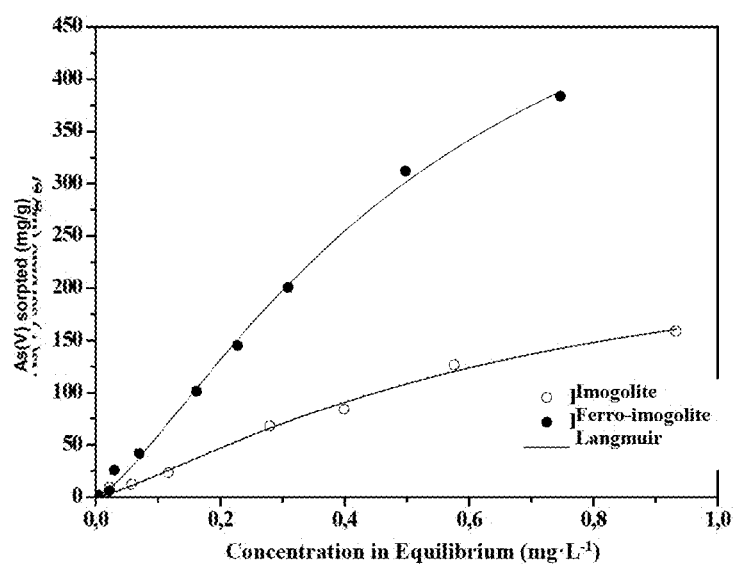
FIG. 8. Sorption isotherm for As (V) over imogolite and Ferro-imogolite.

The sorption isotherms of As(V) on imogolite and Ferro-imogolite are shown in FIG. 8. The values of $q_m$ determined for both nanoparticles show significant differences between them, with this parameter being 2.5 times greater for Ferro-imogolite than for imogolite, indicating that the sorption of As(V) is strongly influenced by the type of surface that nanoparticles have.

On imogolite the sorption of As(V) is highly favored since the $\equiv Al_2-OH$ and $\equiv Al-OH$ groups that constitute the outer surface of this clay are charged positively over a wide pH range (3-9), allowing arsenate to be adsorbed on these groups through a ligand exchange mechanism, as described by equations 3 and 4.

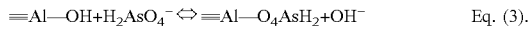   Eq. (3).

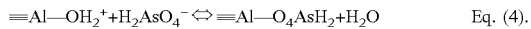   Eq. (4).

In the case of Ferro-imogolite the increased sorption of As can be accounted for by the presence of new superficial active groups contributed by the Fe oxides ($\equiv$Fe—OH), which have greater affinity for As(V) because they form mono- and bi-dentate complexes and bi-dentate-bi-nuclear complexes through a ligand exchange mechanism with the hydroxyls of the $\equiv$Fe—OH groups, leaving the arsenate coordinated with the iron (Eqs. 5 and 6).

   Eq. (5).

   Eq. (6).

The sorption intensity $K_L$ is also greater in Ferro-imogolite, indicating that the As is adsorbed spontaneously more strongly and faster in Ferro-imogolite due to the greater presence of superficial active groups specific for As(V), even though during the coating process the surface of this nanoparticle was modified drastically, decreasing its surface area and charge.

According to the structural characterization made to the Ferro-imogolite binary system by means of DRX, MET, Mössbauer spectroscopy, and SE ME, it can be concluded that this nanoparticle has a crystallinity degree intermediate to that of the starting materials. Magnetite is identified as the Fe oxide formed during the process of magnetization of imogolite, which did not alter the structure and dimensions of imogolite, establishing that the average size of this oxide is in an approximate range of 20 to 50 nm, and the size of the magnetite formed in Ferro-imogolite is 5 times smaller than that found in the iron oxide/imogolite mixture.

EM measures showed that the Ferro-imogolite IEP is displaced to more acidic pHs, allowing better cation sorption compared to imogolite, at pH ranges found under natural environmental conditions. Strong chemical interaction was determined between magnetite and imogolite, by means of the Ferro-imogolite electrophoretic behavior, which was significantly different from that of the iron oxide/imogolite mixture, showing two types of particles.

The magnetic parameters determined from the hysteresis curves and by a SQUID magnetometer were characteristic of each system. For Ferro-imogolite the coercitivity, remanence, and saturation magnetization were the lowest among the systems that were studied, but the characteristics found for the nanohybrid formed allow classifying it as a magnetic nanoparticle.

An increase in the sorption capacity for Cu(II), Cd(II), and As(V) of Ferro-imogolite compared to imogolite, due to the presence of magnetite, was clearly observed. The incorporation of Fe causes a decrease in the IEP, thereby favoring electrostatic interactions at the working pH, while the high sorption seen for As(V) corresponds to the specific interaction of this element with the surface active sites of imogolite and magnetite.

The Langmuir's sorption model showed the best fit for all the trace elements on imogolite and Ferro-imogolite. The data obtained from the multi-component systems showed that competition decreases considerably the sorption capacity of both nanoparticles, as indicated by the $K_L$ values.

The results show that Ferro-imogolite is an efficient nanoparticle in removing trace elements such as Cu(II), Cd(II), and As(V), even in systems where there is competition for the sorption sites. Therefore, this new material has potential uses in the treatment of contaminated water.

The invention claimed is:

1. Inorganic nanoparticle, of magnetic Ferro-imogolite, for removing trace elements wherein the nanoparticle comprises in its structure is imogolite coated with magnetic iron oxide which corresponds to magnetite with traces of goethite, the imogolite being a nanotubular aluminosilicate, and the Ferro-imogolite is a nanohybrid magnetic that has a surface area of around 206 m²/g, and a pore diameter of 15 Å.

2. Inorganic nanoparticle according to claim 1, wherein it has superparamagnetic properties when the existing iron oxide is mostly magnetite.

* * * * *